Aug. 3, 1965  F. HOCK  3,198,061
OPTICAL SYSTEM FOR ANALYZING MOVEMENT OF A MOVABLE GRATING
Filed April 6, 1960

INVENTOR
FROMUND HOCK
BY
Toulmin & Toulmin
ATTORNEYS 3,198,061
OPTICAL SYSTEM FOR ANALYZING MOVEMENT OF A MOVABLE GRATING
Fromund Hock, Wetzlar (Lahn), Germany, assignor to Ernst Leitz G.m.b.H., Wetzlar (Lahn), Germany
Filed Apr. 6, 1960, Ser. No. 20,423
Claims priority, application Germany, Apr. 9, 1959, L 32,923
12 Claims. (Cl. 88—14)

The present invention relates to an optical analyzing system for optical gratings and based on the two phase principle.

Optical analyzing systems of this general nature are known. In one of these known systems the light is modulated as a result of the moire effect. This effect substantially resembles a "water silk" pattern which is caused by interference between two gratings on screens having lines thereon. This interference can be caused by two optical gratings having different spaces between lines thereon or by using two gratings with one grating being positioned at an angle with respect to the other. Thus the same effect can be produced using similar optical gratings or using different optical gratings. In this known system the light is more effectively utilized and a greater accuracy is obtained because a large number of grating lines are involved in producing the moire effect.

The present invention discloses an optical analyzing system which has all the advantages of known systems and in addition permits the reception of two phases of modulated light rays at one of the gratings which essentially functions as the analyzing point. The gratings used may employ standard scale lines thereon. The present invention essentially comprises an optical system positioned between a movable grating or grid and a stationary grating with both gratings being similar. By means of an optical system at least a pair of images is produced in the plane of the stationary grating from a single point of the movable grating illuminated by a source of light positioned behind the movable grating. The resulting images are laterally spaced with respect to each other as well as with respect to the central optical axis of the optical system in the plane of the stationary grating. There are also provided light receivers energizable by light energy and each receiving the light from one partial image.

The optical system comprises double refracting optical elements which may comprise either a Wollaston prism or a Savart plate. The partial images formed in this embodiment of the invention are then spaced from each other.

Another embodiment of the invention comprises ray divider means consisting of either dispersing prisms or a conventional ray dividing grid or diffraction gratings.

It has been found that best results and more favorbale advantages accrue from this invention when the spacing between the two images is ¼ or $(2n+1)/4$ of the distance between the ruled lines on the gratings with $n$ being an arbitarily selected integer.

A ray divider may be positioned behind the stationary grating. Ray receivers are positioned for receiving optical signals that are correlated to the two images. The ray divider directs the separated rays to distant points. When light rays are employed having two polarized images, a Nicol prism with two optical output paths can be used. The polarizing ray divider may comprise a plurality of thin laminations.

When two differently colored images are formed, a prism can be used for dividing the rays. This prism could, for example, reflect red rays by allowing the passage of blue rays. In addition, a second direct vision prism could also be used.

For some purposes it may be advantageous to use a ray divider where the separation of the rays is based on the different colors of the spectrum in combination with a ray divider where the separation is based on the different direction of polarization. With this arrangement a four phase system is obtained.

Other purposes and advantages of this invention will be apparent upon reference to the accompanying description when taken in conjunction with the following drawing wherein.

Figure 1:
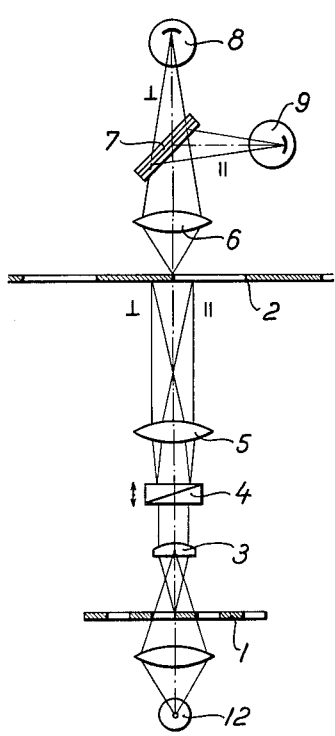
FIGURE 1 shows a schematic arrangement of the optical analyzing system of this invention with the two images comprising polarized light.

A specific embodiment of this invention is illustrated in FIGURE 1 of the drawings and will next be described. In FIGURE 1 there is shown a movable optical grating 1 and a stationary optical grating 2. The optical system with respect to these two gratings comprises an objective lens 3, a Wollaston prism 4, and a converging lens 5. Positioned outwardly of the stationary grating is a converging lens 6 and a ray divider 7 such as a polarizing multilayer beam splitter which, for example, allows perpendicular polarized light to pass but reflects parallel polarized light. Photoelectric cells 8 and 9 are provided to receive the rays separated by the ray divider 7. A light source 12 provides for the necessary illumination.

The Wollaston prism 4 and the converging lens 5 will produce two images which are spaced from each other and are polarized perpendicularly to each other. These two images are produced in the plane of the stationary grating 2. The wollaston prism 4 is preferably arranged in a slightly converging or diverging ray so that it is easily possible to adjust the shearing of the images by moving the Wollaston prism along its optical axis which is also the optical axis of the optical system producing the images.

By obtaining two distinct images from the movable grating 1 and by modulating both of these images by means of the stationary grating 2 there are obtained two groups of light fluxes which differ from each other in their phases. A desired phase difference of 90° can be established by the spacing of the two images. The two modulated light fluxes having different phases are then directed on corresponding photoelectric cells and the resulting signals can be used in a conventional manner for indicating the amount, speed, and direction of movement of the movable grating. The electrical output of the photoelectric cells may be amplified and recorded, if desired, as a function of time or other variable by means of an oscillograph.

Figure 2:
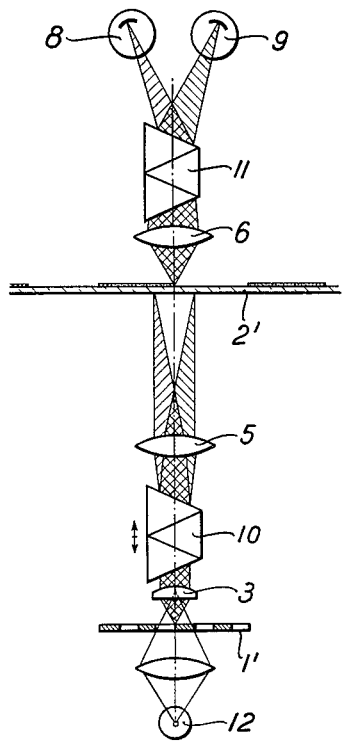
FIGURE 2 shows a modification of this invention wherein the two images are distinguishable by their colors.

In FIGURE 2 there is a movable grating $1^1$ and the Wollaston prism 4, as illustrated in FIGURE 1, is replaced by a direct vision prism 10. A second direct vision prism 11 is substituted for the light divider. As a result the light rays coming from the plane of the stationary grating $2^1$ are separated according to their color and are directed onto a photoelectric cell 8 and 9, respectively.

Figure 3:
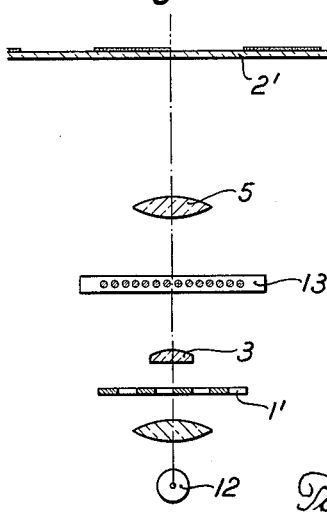
FIGURE 3 shows a modification of the arrangement shown in FIGURE 2.

The second direct vision prism 1 could be replaced by a ray divider which reflects red light and permits passage of blue light. Accordingly, the light rays from the red image would be reflected to one photoelectric cell and the rays from the blue image would be directed to the other photoelectric cell. FIG. 3 shows that prism 10, for example, can be replaced by a ray dividing grid means.

Thus it can be seen that the present invention comprises a simple but effective optical analyzing system which utilizes stationary and movable grating in conjunction with an optical system.

It will also be understood that this invention is susceptible to modification in order to adapt it to different usages and conditions, and, accordingly, it is desired to comprehend such modifications within this invention as may fall within the scope of the appended claims.

I claim:

1. In an optical analyzing system, the combination comprising: a movable optical grating; a light source for illuminating said grating from one side thereof; a single stationary optical grating at the other side of said movable grating; stationary optical means including ray divider means for forming two characteristically distinguishable images of a single point of said movable grating onto said single stationary grating, said two images being laterally displaced with respect to the optical center axis of said optical means in the direction of image movement as occurring upon movement of said grating, which direction coincides with the direction of extension of said stationary grating; two light receiver means; and optical analyzing means for individually observing said characteristically distinguishable, laterally displaced images on said single stationary grating and correspondingly and respectively energizing said two receiver means with the light energy from said two images.

2. In an optical analyzing system, as claimed in claim 1, said analyzing means comprising a single lens means for observing both of said two images and a further ray divider positioned between said stationary grating and said two ray receiver means, for separating spatially said images.

3. In an optical analyzing system, the combination comprising: a movable optical grating; a light source for illuminating said grating from one side thereof; a stationary optical grating at the other side of said movable grating; stationary optical means including ray divider means for forming two spatially separated images of a single point of said movable grating onto said stationary grating, said two images being laterally displaced with respect to the optical center axis of said optical means in the direction of image movement as occurring upon movement of said grating, which direction coincides with the direction of extension of said stationary grating; and two light receiver means including further optical means individually responsive to the light from said two images on said stationary grating.

4. In an optical anaylzing system, as claimed in claim 3, with said optical ray divider means including a double refracting means.

5. In an optical analyzing system, as claimed in claim 2 with said double refracting means comprising at least one Wollaston prism.

6. In an optical analyzing system, as claimed in claim 2 with said double refracting means comprising at least one Savart plate.

7. In an optical analyzing system, as claimed in claim 3, with said optical means comprising an image forming lens system having interposed in its ray path the ray divider means.

8. In an optical analyzing system, as claimed in claim 7, with said ray divider means comprising direct vision prisms.

9. In an optical analyzing system, as claimed in claim 7, with said ray divider means comprising a diffraction grating.

10. In an optical analyzing system, as claimed in claim 7, said lens system and said ray divider means being positioned relative to said gratings so that said images are spaced from each other about one-quarter the distance between the lines on said gratings.

11. In an optical analyzing system, as claimed in claim 7, said lens system and said ray divider means being positioned relative to said gratings so that said images are spaced from each other about $(2n+1)/4$ the distance between the lines on said gratings.

12. In an optical analyzing system, as claimed in claim 3, said ray divider means being movable along the optical axis of the optical image forming means.

References Cited by the Examiner

UNITED STATES PATENTS

| | | | |
|---|---|---|---|
| 1,794,341 | 2/31 | Parkhurst | 88—14 |
| 2,416,968 | 3/47 | Turretini | 250—235 |
| 2,948,890 | 8/60 | Barth et al. | 88—14 X |

JEWELL H. PEDERSEN, *Primary Examiner.*

WILLIAM MISIEK, EMIL G. ANDERSON, FREDERICK M. STRADER, *Examiners.*